United States Patent [19]

Kleynjans et al.

[11] Patent Number: 4,823,421
[45] Date of Patent: Apr. 25, 1989

[54] HYDRAULIC LIP ACTUATOR FOR DOCK LEVELER

[75] Inventors: Joseph P. H. Kleynjans; Walenty Kalempa, both of Coraopolis; Dominic J. Pealer, Bridgeville, all of Pa.

[73] Assignee: Eriks Holding N.V., Alkmaar, Netherlands

[21] Appl. No.: 69,008

[22] Filed: Jul. 1, 1987

[51] Int. Cl.⁴ .............................................. E01D 1/00
[52] U.S. Cl. ...................................... 14/71.3; 14/71.7
[58] Field of Search ....................... 14/71.1, 71.3, 71.7

[56] References Cited

U.S. PATENT DOCUMENTS

| | | | |
|---|---|---|---|
| 3,271,801 | 9/1966 | Dieter et al. | 14/71.3 |
| 3,290,709 | 12/1966 | Whitenack, Jr. et al. | 14/71.7 |
| 3,334,368 | 8/1967 | McIntosh et al. | 14/71.3 |
| 3,685,076 | 8/1972 | Loblick | 14/71 |
| 3,694,839 | 10/1972 | Loblick | 14/71 |
| 3,694,840 | 10/1972 | Loblick | 14/71 |
| 3,699,601 | 10/1972 | Hecker, Jr. et al. | 14/71.3 |
| 3,728,753 | 4/1973 | Beckwith et al. | 14/71.3 |
| 4,091,488 | 5/1978 | Artzberger | 14/71.7 |
| 4,257,136 | 3/1981 | Loblick | 14/71.7 |
| 4,343,058 | 8/1982 | Loblick | 14/71.7 |
| 4,365,374 | 12/1982 | Bennett | 14/71.7 |
| 4,619,008 | 10/1986 | Kovach et al. | 14/71.7 |
| 4,641,388 | 2/1987 | Bennett et al. | 14/71.7 |
| 4,662,021 | 5/1987 | Hagen et al. | 14/71.3 |
| 4,744,121 | 5/1988 | Swessel et al. | 14/71.7 |

Primary Examiner—Jerome W. Massie
Assistant Examiner—Matthew Smith
Attorney, Agent, or Firm—Joseph P. Gastel

[57] ABSTRACT

A dock leveler including a base frame, a deck having its inner side pivotally mounted on the base frame and having a lip pivotally mounted on its outer side, mechanism for raising and lowering the deck, and a fluid circuit and associated linkage for raising the lip in response to raising the deck and for lowering the lip in response to lowering the deck, the fluid circuit including a first piston and cylinder unit connected between the base frame and the deck, a second piston and cylinder unit connected between the deck and the lip, and a conduit coupling the first and second piston and cylinder units so that fluid is pumped from the first piston and cylinder unit to the second piston and cylinder unit during raising of the deck to raise the lip and the reverse is experienced during the lowering of the deck to lower the lip. The first piston and cylinder unit is yieldably mounted between the base frame and the deck and the second piston and cylinder unit is movably mounted on the deck to thereby permit yielding movement of the lip in either direction if it is subjected to external forces. Structure is provided for selectively deactivating the first piston and cylinder unit to permit the lip to drop after it has been raised.

29 Claims, 5 Drawing Sheets

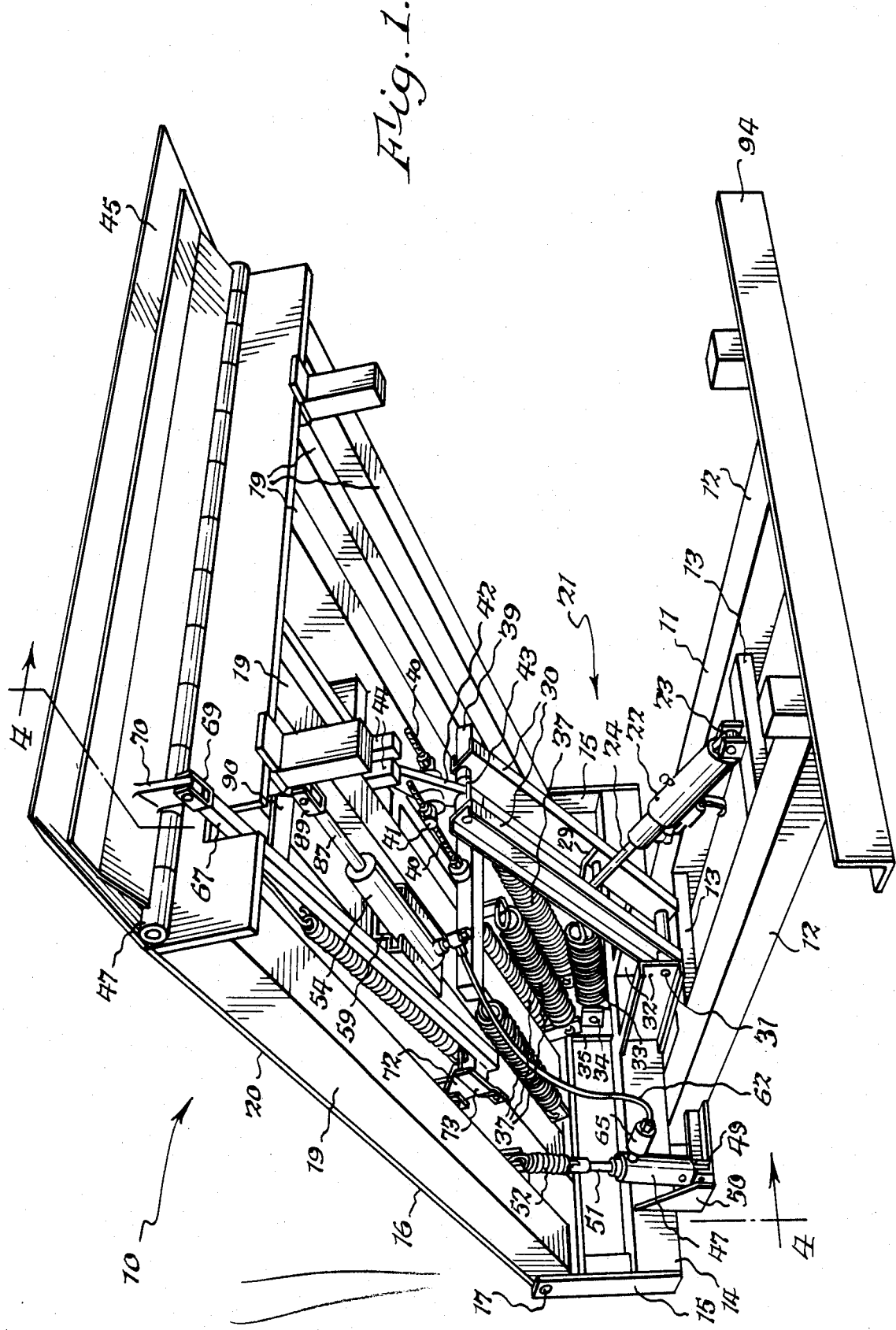

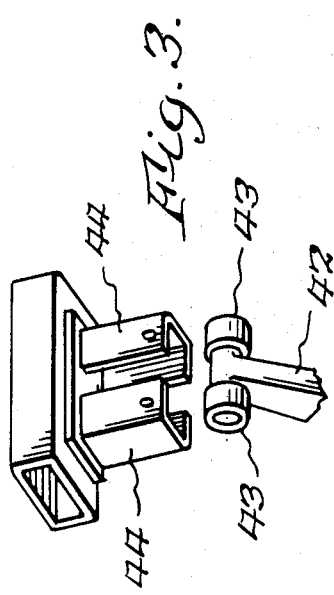
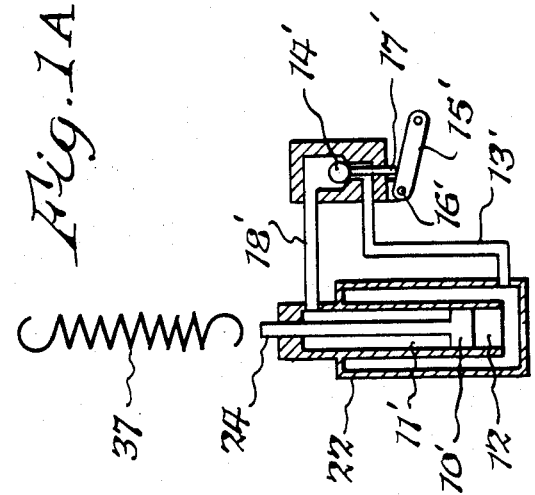
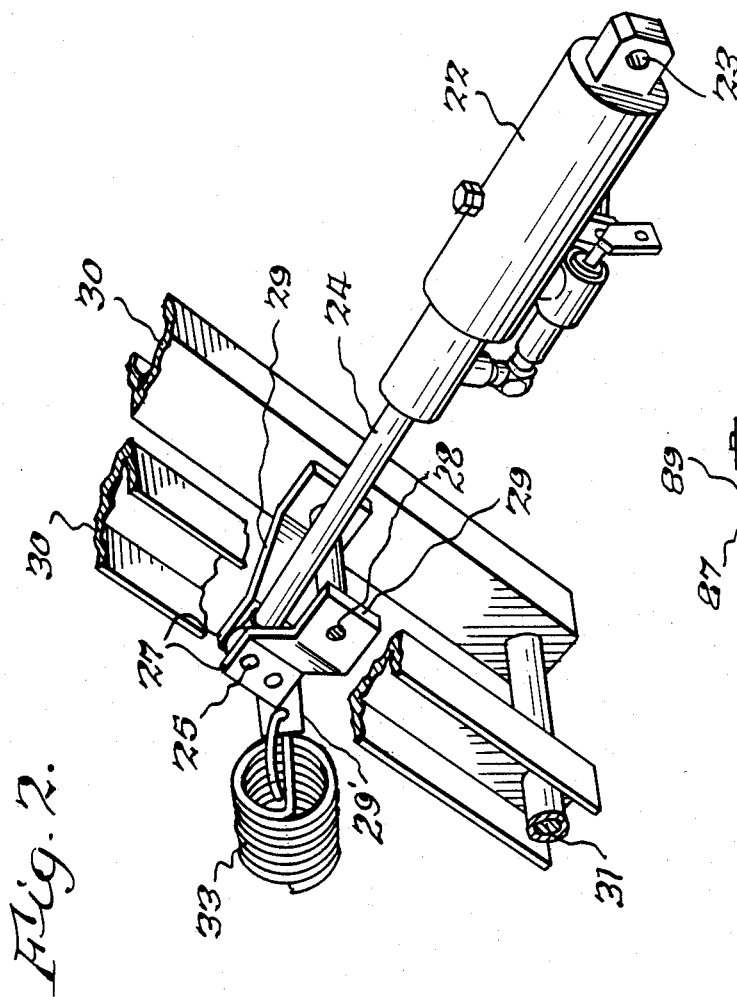
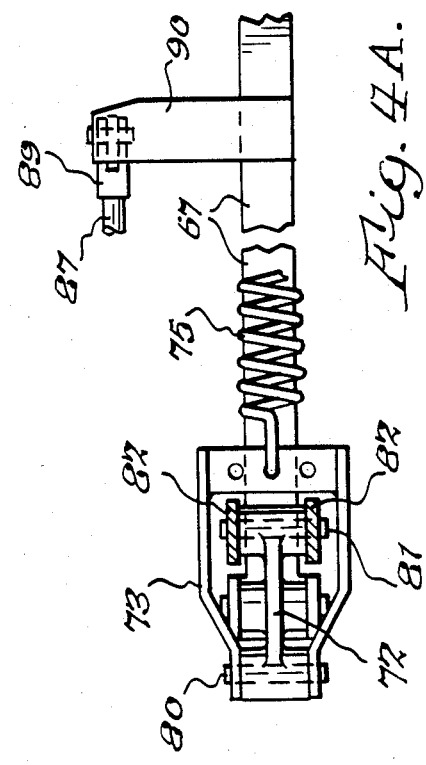

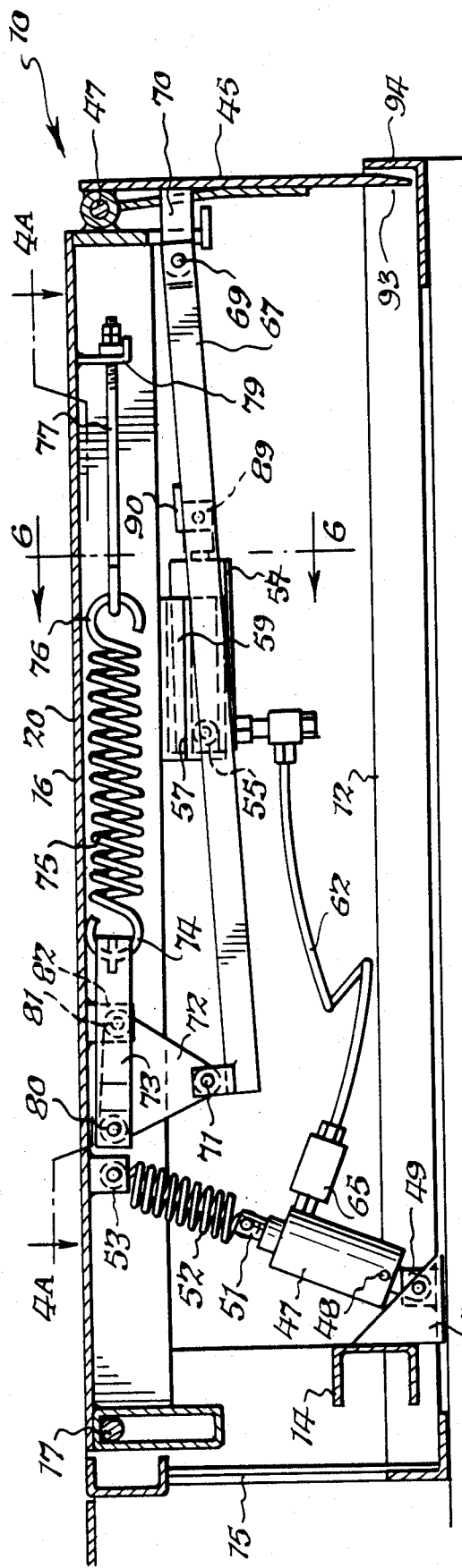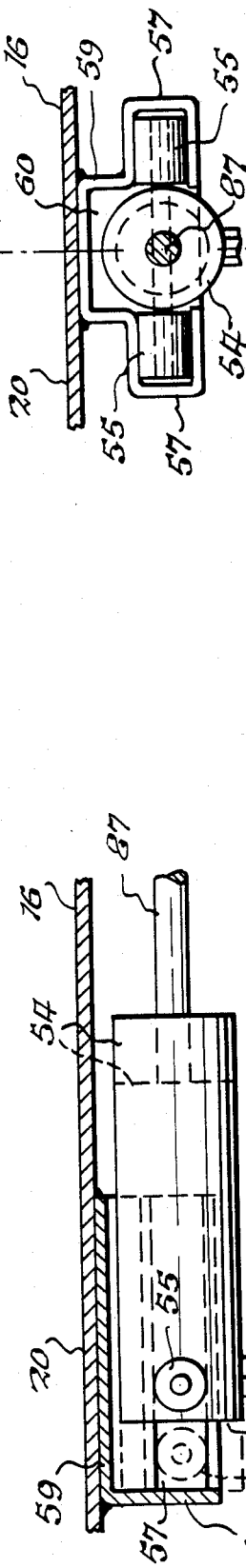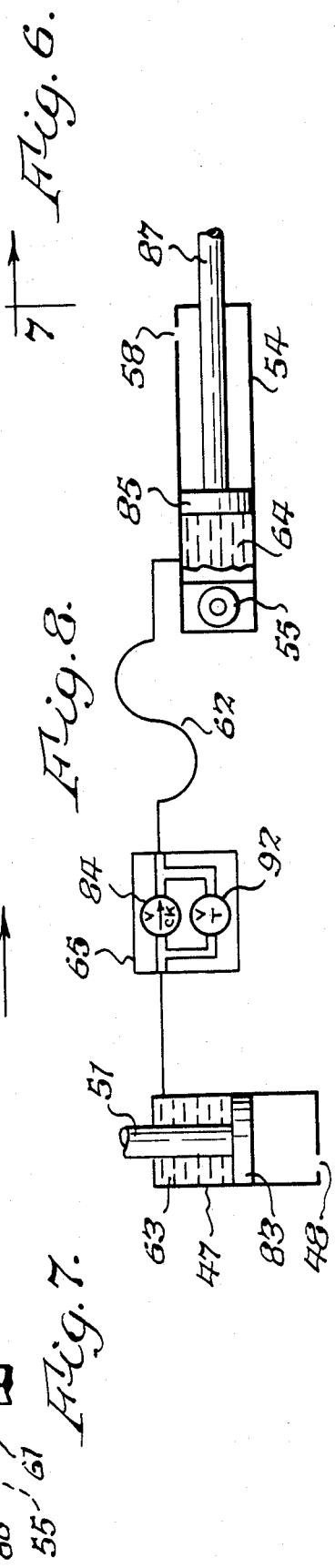

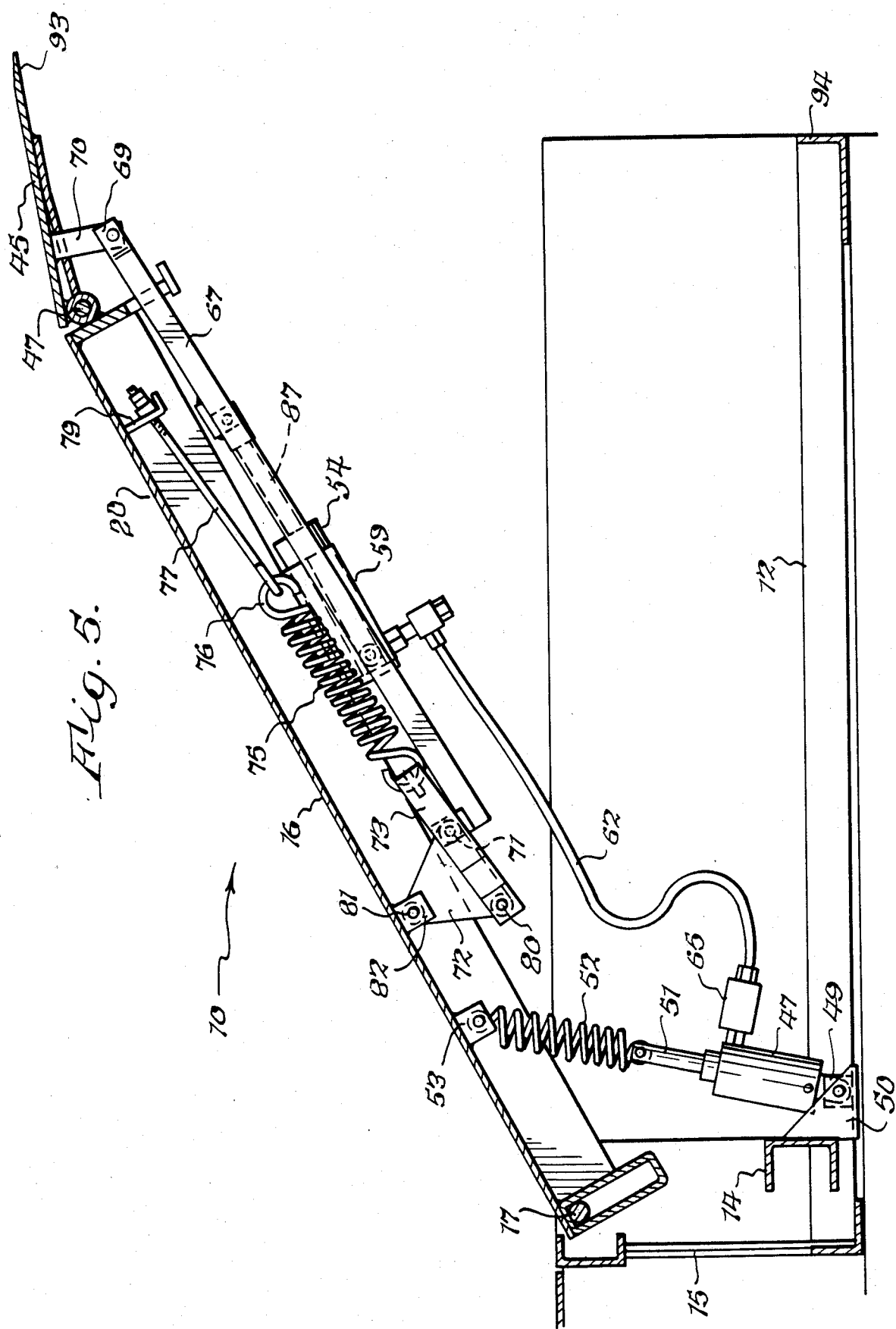

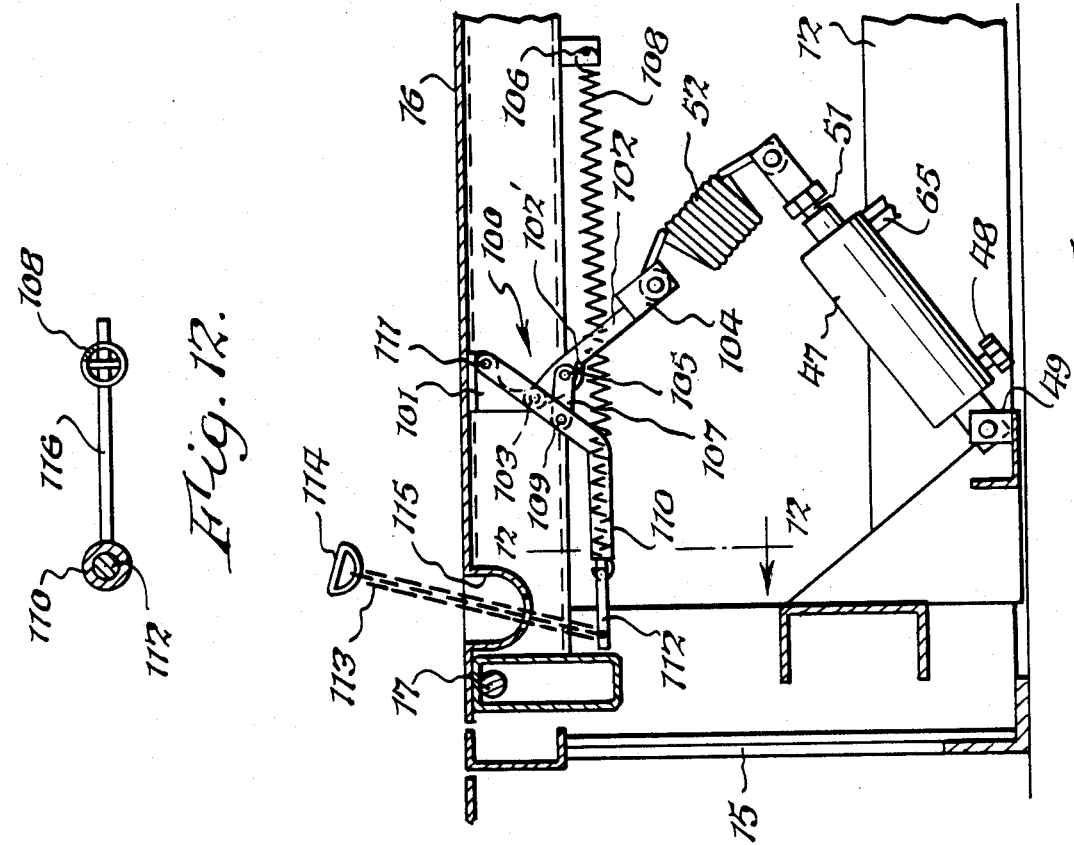
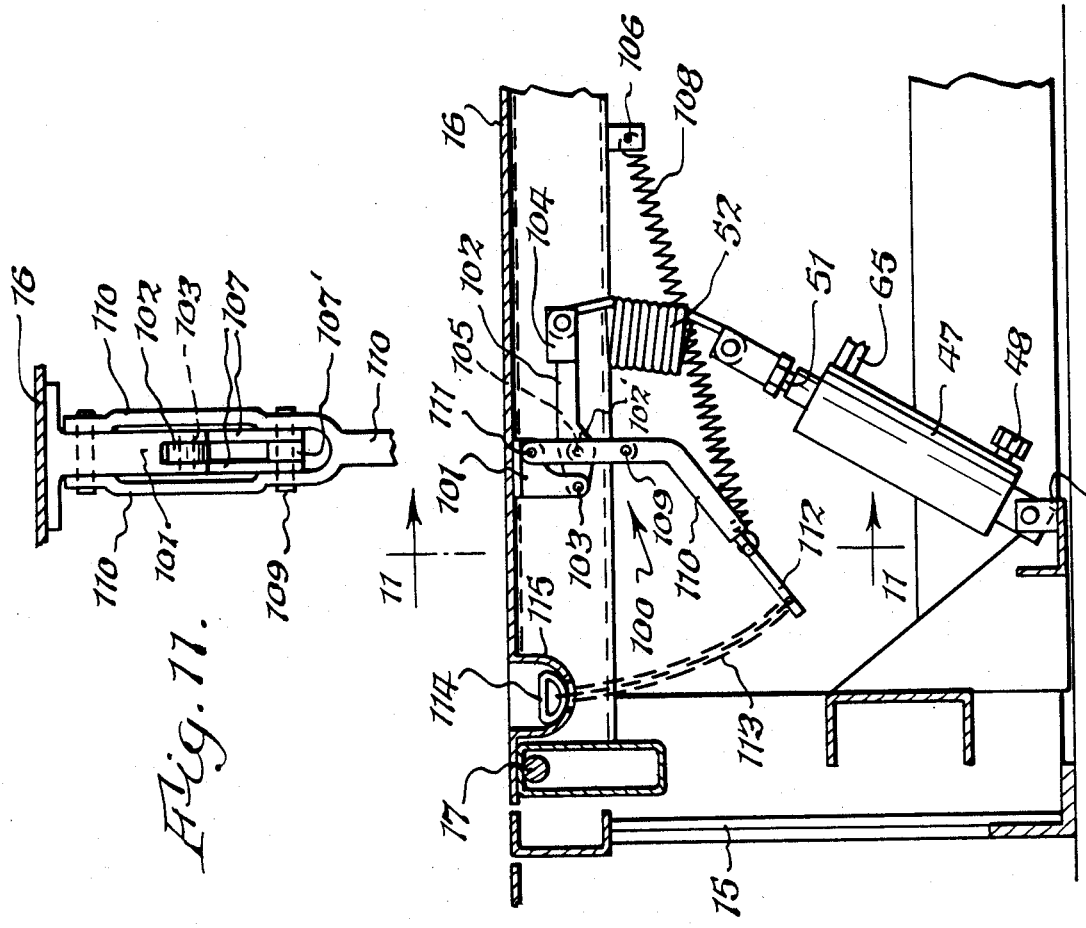

HYDRAULIC LIP ACTUATOR FOR DOCK LEVELER

BACKGROUND OF THE INVENTION

The present invention relates to an hydraulic lip actuator for a dock leveler.

By way of background, dock levelers are devices which are mounted at a warehouse door and have a deck which in its stored position is flush with the warehouse floor so that traffic can pass over it. When a truck is to be unloaded, the dock leveler can be raised to provide a ramp to the truck bed. A pivotable lip is attached to the outer side of the deck, and this lip rests on the end of the truck bed to provide a smooth joint therewith. Insofar as known, in the past the lips were actuated by rather complex mechanical linkages.

SUMMARY OF THE INVENTION

It is accordingly one object of the present invention to provide an improved lip actuator which operates strictly hydraulically to raise and lower the dock leveler lip in response to the raising and lowering, respectively, of the dock leveler deck.

Another object of the present invention is to provide an hydraulic actuating mechanism for raising and lowering the dock leveler lip and which permits the lip to yield in either direction in the event external forces are applied thereto, either manually or by the lip encountering an obstruction.

A further object of the present invention is to provide an hydraulic lip actuating mechanism for a dock leveler which provides controlled movement of the lip during raising and lowering of the dock leveler deck.

Yet another object of the present invention is to provide an hydrulic mechanism for raising and lowering a dock leveler lip which does not require any external power inasmuch as it operates in response to the raising and lowering of the deck.

Still another object of the present invention is to provide structure for selectively deactivating the hydraulic mechanism to permit the lip to drop while the deck is raised. Other objects and attendant advantages of the present invention will readily be perceived hereafter.

The present invention relates to a dock leveler comprising a base frame, a deck having inner and outer sides, first hinge means pivotally mounting said inner side on said base frame, a lip, second hinge means pivotally mounting said lip on said outer side, means for pivotally raising and lowering said deck about said first hinge means, and fluid pump and motor means operatively coupled between said deck and said lip and said base frame for raising said lip in response to raising of said deck and for lowering of said lip in response to lowering of said deck. The present invention may also include means for selectively deactivating said fluid pump and motor means to permit said lip to be lowered while the deck is raised.

The various aspects of the present invention will be more fully understood when the following portions of the specification are read in conjunction with the accompanying drawings wherein:

BRIEF DESCRIPTION OF THE DRAWINGS

FIG. 1 is a perspective view of a dock leveler incorporating a deck lifting and holding mechanism and the improved lip actuating structure of the present invention;

FIG. 1A is a schematic representation of the hydraulic cylinder of the deck lifting and holding mechanism;

FIG. 2 is a fragmentary perspective view of the structure at the connection between the end of the holddown piston and its associated linkage;

FIG. 3 is a fragmentary perspective view of the connection between the underside of the deck and an associated portion of the deck lifting linkage;

FIG. 4 is a fragmentary cross sectional view taken substantially along line 4—4 of FIG. 1 and showing the improved lip actuating structure of the present invention with the deck in its fully lowered position and with certain portions of FIG. 1 being omitted in the interest of clarity;

FIG. 4A is a fragmentary view taken substantially along line 4A—4A of FIG. 4, with certain portions of FIG. 4 omitted in the interest of clarity;

FIG. 5 is a view similar to FIG. 4 but showing the deck in a raised position and the lip in a raised position;

FIG. 6 is a fragmentary cross sectional view taken substantially along line 6—6 of FIG. 4, with certain portions omitted, showing the mounting for the lip actuating cylinder;

FIG. 7 is a fragmentary cross sectional view, taken substantially along line 7—7 of FIG. 6;

FIG. 8 is a schematic view of the hydraulic circuit of the lip actuating structure;

FIG. 9 is a fragmentary side elevational view of an alternate embodiment of the present invention which includes structure for selectively deactivating the lip actuating structure in a position wherein it does not deactivate it;

FIG. 10 is a view of the structure of FIG. 9 in a position wherein it deactivates the lip actuating structure;

FIG. 11, is a fragmentary view in the direction of arrows 11—11 of FIG. 9 showing details of the toggle clamp; and FIG. 12 is a cross sectional view along line 12—12 of FIG. 10 showing the connection between the toggle clamp and its return spring.

DESCRIPTION OF THE PREFERRED EMBODIMENTS

The improved lip actuating structure of the present invention (FIGS. 4–8) is shown in mounted relationship on the dock leveler 10 of FIG. 1. Briefly, the dock leveler 10 includes a base frame 11 consisting of spaced structural members 12 connected by cross members 13 and 14. Angle members 15 are suitably secured at the opposite ends of member 14, and a deck 16 is pivotally mounted by hinge 17 on angle members 15. A plurality of structural braces 19 support plate 20 of deck 16.

A deck raising and holding assembly 21 is connected between base frame 11 and deck 16, and it functions to permit deck 16 to pivot in a counterclockwise direction about hinge 17 when the holding structure is released. The deck raising and holding assembly includes a cylinder 22 having one end connected to a clevis 23 mounted on cross member 13. The piston rod 24 is pivotally mounted on pin 25 (FIG. 2) which fits across the open end 27 of bracket 29 which is pivotally mounted at 28 between elongated channels 30 which in turn have their lower ends pivotally mounted on pin 31 which extends between channels 32 secured to base frame 14. A spring 33 has one end effectively attached to bracket 29 by link 29' and its opposite end attached to lug 34 mounted on frame member 35.

The deck raising and holding assembly 21 also includes a plurality of springs 37 having first ends connected to lugs (not numbered) attached to the underside of deck 16 and their opposite ends attached to front spring hanger 39, which is essentially an elongated bar. A pair of threaded rods 40 have first ends secured to bar 39 and their opposite ends connected to pin 41 (FIG. 1) which is pivotally mounted in triangular link 42, the lower end 43' of which is pivotally mounted between the ends of channel members 30. The upper end of triangular link 42 (FIG. 3) has rollers 43 mounted thereon which are rollably received in channels 44 secured as to the underside of deck 16.

The cylinder 22 (FIG. 1A) acts as an hydraulic lock by trapping hydraulic fluid on opposite sides of the piston head 10' therein. The chambers 11' and 12' on opposite sides of the piston are connected by conduits 13' and 18' having a check valve 14' therebetween, and when the check valve is opened, as by the actuation of lever 15' in a counterclockwise direction by a suitable cable (not shown) attached to lever 15', lever 15' will move counterclockwise about pivot 16' to raise stem 17. Thus springs 37 can cause channels 30 to pivot in a counterclockwise direction about pin 31 to raise the deck 16. When the check valve is closed, the hydraulic fluid is locked on opposite sides of the piston head 10' within cylinder 22 to hold the deck 16 in its elevated position. Check valve 14' closes when the force applied to lever 15' by the above-mentioned suitable cable (not shown) is released and when springs 37 acting through the linkage connected to channels 30 bias piston rod 24 upwardly. The closing of check valve 14' prevents the deck 16 from being lifted because fluid is incapable of flowing through conduits 3' and 18'.

When a weight is applied to the upper surface of deck 6, as by a person walking out onto the deck, the biasing force of springs 37 will be overcome and a sufficient downward force will be applied to piston rod 24 to cause piston head 10' to force fluid into conduit 13' and unseat check valve 14' to permit flow through conduits 13' and 18'. Thus the deck can be lowered until the lip 45, which is mounted on deck 16 by hinge 7, engages the rear end of a truck bed or until the weight is removed from deck 16.

The operation of cylinder 22 is the same as described for the cylinder in U.S. Pat. No. 4,257,136, which is incorporated herein by reference. It is deemed unnecessary to describe the operation of cylinder 22 in further detail inasmuch as the deck raising and lowering assembly heretofore described by itself does not form any part of the present invention other than to provide background structure to show that the deck 16 is raised and lowered during operation.

Variations of the aforedescribed deck raising and lowering structure 21 can be used instead of that specifically shown. Such structures are disclosed and claimed in U.S. Pat. Nos. 4,257,136, 3,694,839 and 3,694,840, all of which are incorporated herein by reference. In fact, insofar as the present invention is concerned, any suitable mechanical hydraulic or hydromechanical structure can be used for raising and lowering the deck 16 as such structure forms no part of the present invention by itself.

In accordance with the present invention an improved lip actuating mechanism is provided for automatically gradually raising the lip 45 as the deck 16 is raised and for gradually lowering lip 45 as the deck is lowered. More specifically, a reservoir cylinder 47 has its lower end pivotally mounted at clevis 49 mounted on bracket 50 secured between base frame members 12 and 14. Piston rod 51 associated with cylinder 47 is attached to one end of spring 52, the other end of which is secured to lug 53 mounted on the underside of deck plate 20. A lip actuating cylinder 54 has one end mounted on rollers 55 which are received in tracks 57 of bracket 59 which is secured to the underside of deck plate 20. An end plate 60 is located at the end of bracket 59 and is normally abutted by the end 61 of cylinder 54 during most conditions of operation, as will be set forth in greater detail hereafter. A conduit 62 effects communication between chamber 63 (FIG. 8) of reservoir cylinder 47 and chamber 64 of cylinder 54. A valve 65 is located in conduit 62. Vents 48 and 58 are provided in cylinders 47 and 54, respectively.

A mechanical linkage is located between lip 45 and deck 16. This linkage includes an elongated link 67, one end of which has a clevis connection 69 with lug 70 attached to the underside of lip 45. The opposite end of link 67 has a clevis connection at 71 with triangular link 72. An essentially U-shaped bracket 73 has one end attached to the end 74 of spring 75 which has its opposite end 76 mounted on one end of eye bolt 77, the opposite end of which is mounted on lug 79 secured to the underside of deck 20. The end of U-shaped bracket 73 remote from spring end 74 is pivotally mounted at 80 on triangular link 72. The third corner of triangular link 72 is pivotally mounted at 81 on lugs 82 secured to the underside of deck plate 20. This linkage is a prior art construction which was mechanically actuated in response to raising and lowering of prior dock leveler decks.

In operation, when the deck 16 is being raised by the above described deck raising and holding assembly 21, the lip 45 will also automatically be moved gradually from the position of FIG. 4 to the position of FIG. 5. In this respect, as deck 16 is being raised, piston rod 51 of cylinder 47 will be pulled from the position of FIG. 4 to the position of FIG. 5 to produce a pumping action. Therefore the piston head 83 (FIG. 8) will force hydraulic fluid from chamber 63 through check valve 84, which is now fully open, and into cylinder chamber 64 behind piston head 85. This will force piston rod 87 of lip actuating cylinder 54 outwardly, and thus produce a motor action. The end of piston rod 87 has a clevis connection 89 with lug 90 secured to link 67, and thus link 67 will move with piston rod 87. This will force lip 45 to pivot in a counterclockwise direction about the axis of hinge 47 because of the clevis connection at 69 between link 67 and lug 70 attached to the underside of lip 45.

During the movement of piston rod 87 to the right in FIGS. 4, 5 and 8, the rear end 61 of cylinder 54 will be in abutting relationship with plate 60 of bracket 59, that is, it will be in the dotted line position shown in FIG. 7. If for any reason it becomes necessary to manually pivot lip 45 further in a counterclockwise direction after deck 16 has stopped as by applying an external manual force thereto, this can be accomplished because cylinder 54 will be able to yield in the direction of the arrow (FIG. 7) because of the rolling connection between rollers 55 and roller tracks 57 of bracket 59. Furthermore, the foregoing yielding action of lip 45 permits lip 45 to pivot counterclockwise when its underside contacts a truck bed, to thus provide a level joinder therewith.

This movement of cylinder 54 to the right also prevents air from being sucked into the chambers of cylinders 47 and 54, which might possibly be the case if cylinder 54 was held stationary and piston rod 87 was moved to the right. When lip 45 is released, after being held manually, its weight will cause it to pivot in a clockwise direction about hinge 47 until the end 61 of cylinder 54 abuts plate 60, that is, until it moves to the dotted line position shown in FIG. 7.

When lip 45 is in its initial vertical stored position of FIG. 4, triangular link 72 is in an overcenter position, that is, pivot point 80 is overcenter relative to pivot point 81 so that spring 75 causes link 67 to hold lip 45 in the position shown. However, when piston rod 87 of cylinder 54 is caused to move in the direction of the arrow of FIG. 7 as hydraulic fluid is forced from cylinder 47 into cylinder 54, triangular link 72 will be moved to an undercenter position so that spring 75 will aid in moving link 67 to the right in FIGS. 4 and 5 to thereby provide a counterbalancing force on lip 45. The counterbalancing force is less than the weight of lip 45. Thus, cylinder 54 does not have to provide the entire force for pivoting lip 45 in a counterclockwise direction about the axis of hinge 47 because such movement is aided by spring 75.

If for any reason it is desired to manually move lip 45 in a clockwise direction about hinge axis 47 when deck 16 and lip 45 are in the elevated position of FIG. 5, or if any other type of external force is applied to lip 45 in this direction, this can be done notwithstanding that the end 61 of cylinder 54 is in abutting relationship with plate 60, that is, in the dotted line position of FIG. 7. This yielding is also desirable in the event the upper side of the raised lip 45 encounters an obstruction during raising of the deck. The foregoing clockwise movement of lip 45 is possible because hydraulic fluid will be forced from chamber 64 of cylinder 54 through conduit 62 and now through throttling valve 92 into chamber 63 of cylinder 47 because check valve 84 is now closed. This will result in piston rod 51 being moved downwardly in FIG. 8. However, such movement can be realized because spring 52 will yield. When the clockwise force is removed from lip 45, spring 52 will again contract forcing piston rod 51 upwardly to thus force hydraulic fluid back into chamber 64 of cylinder 54. Spring 52 serves the additional function of attenuating shock in the hydraulic system when deck 16 is lifted in a counterclockwise direction about the axis of hinge 17. In this respect, spring 52 may initially expand as the deck 16 is raised, and thereafter rod 51 will follow upwardly to force fluid out of chamber 63.

When the deck is lowered in a clockwise direction about the axis of hinge 17 from the position of FIG. 5 toward the position of FIG. 4, lip 45 will gradually pivot in a clockwise direction about the axis of hinge 47 because its weight will force piston rod 87 into chamber 64. This is possible because there will be flow of fluid through conduit 62 and through throttling valve 92 into chamber 63 of cylinder 47 because piston rod 51 can move back into cylinder 47 as deck 16 moves downwardly and spring 52 exerts less force on piston rod 51. It is the throttling of fluid through valve 92 which causes lip 45 to be lowered gradually. If desired, the throttling valve 92 may be adjustable to permit varying of the rate of descent of lip 45 during deck lowering. The weight of lip 45 is sufficiently greater than the lifting force applied by spring 75 so that triangular link 72 will be moved to its overcenter position of FIG. 4, and this will occur prior to the time that deck 16 reaches the position of FIG. 4 wherein the outer tip 93 of lip 45 is housed within flange 94. During the foregoing action the cylinder 54 and its associated piston will act as a pump and cylinder 47 and its associated piston will essentially act as a motor in the sense that the piston rod 51 is forced into the cylinder by the fluid supplied from cylinder 54. It will be appreciated, as noted above, that when link 72 reaches the overcenter position shown in FIG. 4, spring 75 will aid in maintaining lip 45 in its stored position shown in FIG. 4 whereas when lip 72 is in an undercenter position, spring 75 aids movement of lip 45 in a counterclockwise direction.

In FIGS. 9-12 an alternate embodiment of the present invention is disclosed which selectively permits the deactivation of cylinder 47 where "end loading" is required. "End loading" is where the pallets or containers cover the very end of the truck bed. In this situation, the forward end of the truck is loaded in the usual manner with the deck raised and the lip 45 resting on the very end of the truck bed. However, since the last-loaded pallets or containers have to rest on this very end of the truck bed, the lip has to be retracted. This is done by raising the deck and causing lip 45 to drop by deactivating cylinder 47 by the structure desrribed hereafter and then lowering the deck to floor level and end loading the pallets by means of a fork lift. Cylinder 47 is also deactivated in the foregoing manner when it is desired to lower the deck 16 after lip 45 has rested on the end of the truck, without moving the truck away from the dock leveler.

In the lip deactivating structure of FIGS. 9-12 the upper end of spring 52 is connected to a toggle clamp 100 rather than directly to lug 53 as in FIGS. 1-8. More specifically, toggle clamp 100 includes a bracket 101 which is rigidly secured to the underside of deck 16. A horizontal link 102 is pivotally connected at 103 to bracket 101. The outer end of link 102 mounts the upper end of spring 52 at 104. The central portion of link 102 is pivotally connected at 105 to link 107, the opposite end of which is pivotally connected at 109 to elongated link 110, the upper end of which is pivotally connected at 111 to bracket 101. An extension 112 in the nature of a handle is rigidly affixed to the end of link 110, and a chain 113 is secured to extension 112. A manually gripable handle 114 is connected to the opposite end of chain 113 and is housed in a pocket 115 secured to deck 16.

When the toggle clamp 100 is in the position shown in FIG. 9, cylinder 47 can be actuated in response to the raising of deck 16 as described above relative to FIGS. 1-8 because the toggle clamp will remain in the position shown in FIG. 9 during raising of deck 16 with stop pin 102' on link 102 bearing against link 110. However, when it is desired to deactivate cylinder 47 while deck 16 is raised and lip 45 is in a raised condition in either of the above two situations, deck 16 is raised further a sufficient distance so that when lip 45 is lowered, it will clear the end of the truck. Then handle 114 is lifted to pull chain 113 upwardly (FIG. 10) to pivot link 110 in a clockwise direction about pivot 111 against the bias of spring 108 so that it will move from the position of FIG. 9 to the position of FIG. 10 and cause links 107 and 102 to move to the position of FIG. 10. Thus, link 102 will not exert an upward pulling force on spring 52 and thus will not actuate cylinder 47 in the manner described above relative to FIGS. 1-8. Thus fluid will flow from cylinder 54 to cylinder 47, and lip 45 will drop to its most possible vertical position in which the deck is still raised. Thereafter, the deck 16 can be lowered and lip 45 will clear the end of the truck bed.

After the deck has been returned to its lowermost position, spring 108 will return the toggle clamp 100 to the position shown in FIG. 9, considering that spring 52 is not in tension at this time. Thus, when the deck 16 is subsequently raised, the toggle clamp 100 will be in its locked position of FIG. 9 so that link 102 will be able to exert an upward pulling force on spring 52 to actuate cylinder 47 in the manner described above relative to FIGS. 1–8. Spring 108 cannot return the toggle clamp 100 to the position of FIG. 9 when the deck is raised because spring 52, which is stronger than spring 108, would have to be tensioned. The toggle clamp 100 is a standard product manufactured by the Wolverine Tool Co. of Detroit, Michigan and is identified by model number CQ-910A.

If the end of the truck is very close to the end of deck 16 so that the lip will hit it while it is being raised automatically, as described relative to FIGS. 1–8, spring 52 will expand to permit lip 45 to yield until after lip 45 clears the end of the truck, and thereafter spring 52 will contract to raise lip 45 to a position which corresponds to the raised position of deck 16.

While preferred embodiments of the present invention has been disclosed, it will be appreciated that the present invention is not limited thereto but may be otherwise embodied within the scope of the following claims.

What is claimed is:

1. An actuating construction for raising a lip at the outer end of the deck of a dock leveler in response to raising said deck and for lowering said lip in response to the lowering of said deck comprising a base frame, a deck, first hinge means pivotally mounting said deck on said base frame, a lip, second hinge means for pivotally mounting said lip on said deck, means for pivotally raising and lowering said deck about said first hinge means, first fluid cylinder and piston means, first connecting means effectively coupling said first fluid cylinder and piston means between said deck and said base frame, second fluid cylinder and piston means, second connecting means effectively coupling said second fluid cylinder and piston means between said deck and said lip, and conduit means coupling said first fluid cylinder and means to said second fluid cylinder and piston means, said first fluid cylinder and piston means being actuatable in response to pivotal movement of said deck about said first hinge means during raising of said deck for pumping fluid through said conduit means to said second fluid cylinder and piston means to pivot said lip in a first direction about said second hinge means and thus raise said lip, said fluid being pumped from said second fluid cylinder and piston means through said conduit means to said first fluid cylinder and piston means in response to pivotal movement of said deck about said first hinge means during lowering of said deck to thereby pivot said lip about said second hinge means in a second direction which is opposite to said first direction to thereby lower said lip, said second connecting means including lost motion means for permitting externally actuated raising of said lip without affecting flow of fluid through said conduit means between said first and second fluid cylinder and piston means, and a stop associated with said second connecting means for limiting externally actuated lowering movement of said lip.

2. An actuating construction as set forth in claim 1 wherein said second fluid cylinder and piston means includes second fluid cylinder means, and wherein said lost motion means comprises connecting means for mounting said second fluid cylinder means on said deck for permitting bodily movement of said second fluid cylinder means toward said lip and thus permitting said externally actuated raising of said lip and wherein said stop is associated with said connecting means for limiting movement of said second fluid cylinder means away from said lip.

3. An actuating construction as set forth in claim 1 including check valve means in said conduit means for permitting unrestricted one way flow of fluid from said first cylinder and piston means to said second fluid cylinder and piston means during raising of said deck, and throttling means in said conduit means for throttling flow of fluid from said second fluid cylinder and piston means to said first fluid cylinder and piston means as said deck is lowered to thereby effect gradual lowering of said lip.

4. An actuating construction as set forth in claim 3 wherein said second fluid cylinder and piston means includes second fluid cylinder means, and connecting means for mounting said second fluid cylinder means on said deck for permitting bodily movement of said second fluid cylinder means toward said lip and thus permitting said externally actuated raising of said lip and a stop associated with said connecting means for limiting movement of said second fluid cylinder means away from said lip.

5. An actuating construction as set forth in claim 3 including spring means coupled to said first fluid cylinder and piston means for cushioning shock to said first fluid cylinder and piston means as said deck is raised and for permitting externally actuated downward pivotal movement of said lip about said second hinge means when said deck is in a raised position.

6. An actuating construction as set forth in claim 5 wherein said second fluid cylinder and piston means includes second fluid cylinder means, and wherein said lost motion means comprises connecting means for mounting said second fluid cylinder means on said deck for permitting bodily movement of said second fluid cylinder means toward said lip and thus permitting said externally actuated raising of said lip and wherein said stop is associated with said connecting means for limiting movement of said second fluid cylinder means away from said lip.

7. An actuating construction as set forth in claim 1 including deactivating means for selectively effectively uncoupling said first fluid cylinder and piston means from between said deck and said base frame to permit said deck to be raised without raising said lip and to permit a raised lip to be lowered without lowering a raised deck.

8. An actuating construction as set forth in claim 7 wherein said deactivating means comprises a toggle clamp.

9. In a dock leveler having a base frame, a deck with inner and outer sides, first hinge means pivotally mounting said inner side of said deck relative to said base frame, a lip, second hinge means pivotally mounting said lip at said outer side of said deck, an elongated link having first and second ends, first pivot means coupling said first end of said link to said lip, spring means having first and second ends, first means coupling one end of said spring means to said deck, overcenter linkage means, means pivotally mounting said overcenter linkage means on said deck, second pivot means pivotally mounting said second end of said elongated link on said overcenter linkage means, second means coupling said second end of said spring means to said overcenter linkage means, said overcenter linkage means being biased to an overcenter position by said spring means to cause said elongated link to maintain said lip in a lower stored position and said linkage means being biased to an undercenter position after said lip is raised a predetermined amount from said lower stored position to thereby cause said spring means to exert a biasing force urging said lip toward a raised position, and means coupled between said base frame and said deck for raising and lowering said deck about said first hinge means, the improvement comprising first fluid cylinder means, first piston means associated with said first fluid cylinder means, first mounting means mounting said first fluid cylinder means on said base frame, second mounting means mounting said first piston means relative to said deck, second fluid cylinder means, second piston means associated with said second fluid cylinder means, third mounting means mounting said second fluid cylinder means on said deck, fourth mounting means coupling said second piston means to said elongated link, and conduit means coupling said first cylinder means to said second cylinder means for causing fluid to be pumped from said first fluid cylinder means to said second fluid cylinder means as said deck is raised to thereby cause said second piston means to move said elongated link to move said overcenter linkage to said undercenter position and to raise said lip with the aid of said biasing force of said spring means and to cause fluid to be pumped from said second fluid cylinder means to said first fluid cylinder means to cause said second piston means to move said elongated link to lower said lip as said deck is lowered.

10. In a dock leveler as set forth in claim 9 wherein said third mounting means comprises sliding rectilinear connecting means for permitting said second fluid cylinder means to move toward and away from said second hinge means for permitting externally actuated pivotal movement of said lip without affecting flow of fluid between said first and second fluid cylinder means, and a stop on said deck at the opposite end of said second cylinder means from said lip for limiting the movement of said second cylinder means away from said second hinge means.

11. In a dock leveler as set forth in claim 9 including second spring means effectively positioned between said first piston means and said deck for cushioning shock as said platform is raised and for permitting externally actuated pivotal movement of said lip about said second hinge means when said platform is in a raised condition.

12. In a dock leveler as set forth in claim 11 wherein said third mounting means comprises sliding rectilinear connecting means for permitting said second cylinder to move toward and away from said second hinge means for permitting externally actuated pivotal movement of said lip without affecting flow of fluid between said first and second fluid cylinder means, and a stop on said platform at the opposite end of said second cylinder means from said lip for limiting the movement of said second cylinder means away from said second hinge means.

13. In a dock leveler as set forth in claim 9 including valve means in said conduit means for permitting only one-way flow from said first cylinder means to said second cylinder means during raising of said deck, and throttling means in said conduit means bypassing said valve means for throttling flow of fluid from said second cylinder means to said first cylinder means as said deck is lowered.

14. In a dock leveler as set forth in claim 12 including valve means in said conduit means for permitting only one-way flow from said first cylinder means to said second cylinder means during raising of said deck, and throttling means in said conduit means bypassing said valve means for throttling flow of fluid from said second cylinder means to said first cylinder means as said deck is lowered.

15. In a dock leveler as set forth in claim 10 including second spring means effectively positioned between said first piston means and said deck for cushioning shock as said platform is raised and for permitting externally actuated pivotal movement of said lip about said second hinge means when said platform is in a raised condition.

16. In a dock leveler as set forth in claim 10 including valve means in said conduit means for permitting only one-way flow from said first cylinder means to said second cylinder means during raising of said deck, and throttling means in said conduit means bypassing said valve means throttling flow of fluid from said second cylinder means to said first cylinder means for as said deck is lowered.

17. In a dock leveler as set forth in claim 9 including deactivating means for selectively deactivating said first fluid cylinder means to permit said lip to move to a lowered position while said deck remains raised.

18. An actuating construction as set forth in claim 17 wherein said deactivating means comprises a toggle clamp.

19. An actuating construction for raising a lip at the outer end of the deck of a dock leveler in response to raising said deck and for lowering said lip in response to the lowering of said deck comprising a base frame, a deck, first hinge means pivotally mounting said deck on said base frame, a lip, second hinge means for pivotally mounting said lip on said deck, means for pivotally raising and lowering said deck about said first hinge means, first fluid cylinder and piston means effectively coupled between said deck and said base frame, second fluid cylinder and piston means effectively coupled between said deck and said lip, and conduit means coupling said first fluid cylinder and piston means to said second fluid cylinder and piston means, said first fluid cylinder and piston means being actuatable in response to pivotal movement of said deck about said first hinge means during raising of said deck for pumping fluid through said conduit means to said second fluid cylinder and piston means to pivot said lip in a first direction about said second hinge means and thus raise said lip, said fluid being pumped from said second fluid cylinder and piston means through said conduit means to said first fluid cylinder and piston means in response to pivotal movement of said deck about said first hinge means during lowering of said deck to thereby pivot said lip about said second hinge means in a second direction which is opposite to said first direction to thereby lower said lip, spring means coupled to said first fluid cylinder and piston means for cushioning shock to said first fluid cylinder and piston means as said deck is raised and for permitting externally actuated downward pivotal movement of said lip about said second hinge means when said deck is in a raised position, said second fluid cylinder and piston means including second fluid cylinder means, and connecting means for mounting said second fluid cylinder means on said deck for permitting bodily movement of said second fluid cylinder means toward said lip and thus permitting said externally actuated raising of said lip, and a stop associated with said connecting means for limiting movement of said second fluid cylinder means away from said lip.

20. In a dock leveler having a base frame, a deck with inner and outer sides, first hinge means pivotally mounting said inner side of said deck on said base frame, a lip, second hinge means pivotally mounting said lip at said outer side of said deck, link means operatively connected between said deck and said lip for normally retaining said lip in a stored lowermost position and for applying a force for pivoting said lip about said second hinge means toward a raised position after said lip is moved away from said stored lowermost position, and deck raising and lowering means coupled between said base frame and ]said deck for effecting raising and lowering movement of said deck about said first hinge means, the improvement comprising first fluid cylinder and piston means including first cylinder means and first position means, first mounting means mounting said first fluid cylinder and piston means between said base frame and said deck, second fluid cylinder and piston means including second cylinder means and second piston means, second mounting means mounting said second fluid cylinder and piston means between said deck and said lip, conduit means for effecting communication between said first cylinder means and said second cylinder means to permit fluid to be pumped from said first cylinder means to said second cylinder means as said deck is raised and to permit fluid to flow from said second cylinder means to said first cylinder means as said deck si lowered, coupling means coupling said second pistion means to said link means to cause said second cylinder means and said second piston means to move said lip from said stored lowermost position toward a raised position and to raise said lip means in response to the pumping of fluid from said first cylinder means to said second cylinder means through said conduit means when said deck is raised and to lower said lip means in response to the pumping of fluid from said second cylinder means to said first cylinder means through said conduit means as said deck is lowered, valve means in said conduit means for permitting only one-way flow from said first cylinder means to said second cylinder means during raising of said deck, and throttling means in said conduit means bypassing said valve means for throttling flow of fluid from said second cylinder means to said first cylinder means as said deck is lowered.

21. In a dock leveler having a base frame, a deck with inner and outer sides, first hinge means pivotally mounting said inner side of said deck on said base frame, a lip, second hinge means pivotally mounting said lip at said outer side of said deck, link means operatively connected between said deck and said lip for normally retaining said lip in a stored lowermost position and for applying a force for pivoting said lip about said second hinge means toward a raised position after said lip is moved away from said stored lowermost position, and deck raising and lowering means coupled between said base frame and said deck for effecting raising and lowering movement of said deck about said first hinge means, the improvement comprising first fluid cylinder and piston means including first cylinder means and first piston means, first mounting means mounting said first fluid cylinder and piston means between said base frame and said deck, second fluid cylinder and piston means including second cylinder means and second piston means, second mounting means mounting said second fluid cylinder and piston means between said deck and said lip, conduit means for effecting communication between said first cylinder means and said second cylinder means to permit fluid to be pumped from said first cylinder means to said second cylinder means as said deck is raised and to permit fluid to flow from said second cylinder means to said first cylinder means as said deck is lowered, coupling means coupling said second pistion means to said link means to cause said second cylinder means and said second piston means to move said lip from said lip from said stored lowermost position toward a raised position and to raise said lip means in response to the pumping of fluid from said first cylinder means to said deck second cylinder means through said conduit means when said deck is raised and to lower said lip means in response to the pumping of fluid from said second cylinder means to said first cylinder means through said conduit means as said first cylinder second mounting means comprising connecting means for permitting said second cylinder means to move toward and away from said second hinge means for permitting manual pivotal movement of said lip without affecting flow of fluid between said first and second fluid cylinder means, and a stop on said deck at the opposite end of said second cylinder means from said lip for limiting the movement of said second cylinder means away from said second hinge means.

22. In a dock leveler having a base frame, a deck with inner and outer sides, first hinge means pivotally mounting said inner side of said deck on said base frame, a lip, second hinge means pivotally mounting said lip at said outer side of said deck, link means operatively connected between said deck and said lip for normally retaining said lip in a stored lowermost position and for applying a force for pivoting said lip about said second hinge means toward a raised position after said lip is moved away from said stored lowermost position, and deck raising and lowering means coupled between said base frame and said deck for effecting raising and lowering movement of said deck about said first hinge means, the improvement comprising first fluid cylinder and piston means including first cylinder means and first piston means, first mounting means mounting said first fluid cylinder and piston means between said base frame and said deck, second fluid cylinder and piston means including second cylinder means and second piston means, second mounting means mounting said second fluid cylinder and piston means between said deck and said lip, conduit means for effecting communication between said first cylinder means and said second cylinder means to permit fluid to be pumped from said first cylinder means to said second cylinder means as said deck is raised and to permit fluid to flow from said second cylinder means to said first cylinder means as said deck is lowered, coupling means coupling said second pistion means to said link means to cause said second cylinder means and said second piston means to move said lip from said stored lowermost position toward a raised position and to raise said lip means in response to the pumping of fluid from said first cylinder means to said second cylinder means through said conduit means when said deck is raised and to lower said lip means in response to the pumping of fluid from said second cylinder means to said first cylinder means through said conduit means as said deck is lowered, and spring means effectively positioned between said first fluid cylinder and piston means and said deck for cushioning shock as said deck is raised and for permitting downward pivotal movement of said lip about said second hinge means when said deck is stationary in a raised condition.

23. In a dock leveler as set forth in claim 22 wherein said second mounting means comprises connecting means for permitting said second cylinder means to move toward and away from said second hinge means for permitting manual pivotal movement of said lip without affecting flow of fluid between said first and second fluid cylinder means, and a stop on said deck at the opposite end of said second cylinder means from said lip for limiting the movement of said second cylinder means away from said second hinge means.

24. In a dock leveler as set forth in claim 22 including valve means in said conduit means for permitting only one-way flow from said first cylinder means to said second cylinder means during raising of said deck, and throttling means in said conduit means bypassing said valve means for throttling flow of fluid from said second cylinder means to said first cylinder means as said deck is lowered.

25. In a dock leveler as set forth in claim 24 wherein said second mounting means comprises connecting means for permitting said second cylinder means to move toward and away from said second hinge means for permitting manual pivotal movement of said lip without affecting flow of fluid between said first and second fluid cylinder means, and a stop on said deck at the opposite end of said second cylinder means from said lip for limiting the movement of said second cylinder means away from said second hinge means.

26. In a dock leveler as set forth in claim 22 wherein said second mounting means includes means for permitting said lip be to raised manually without affecting flow of fluid between said first and second fluid cylinder means, and stop means associated with said second mounting means for limiting manual lowering of said lip.

27. In a dock leveler having a base frame, a deck with inner and outer sides, first hinge means pivotally mounting said inner side of said deck on said base frame, a lip, second hinge means pivotally mounting said lip at said outer side of said deck, link means operatively connected between said deck and said lip for normally retaining said lip in a stored lowermost position and for applying a force for pivoting a said lip about said second hinge means toward a raised position after said lip is moved away from said stored lowermost position, and deck raising and lowering means coupled between said base frame and said deck for effecting raising and lowering movement of said deck about said first hinge means, the improvement comprising first fluid cylinder and piston means including first cylinder means and first piston means, first mounting means mounting said first fluid cylinder and piston means between said base frame and said deck, second fluid cylinder and piston means including second cylinder means and second piston means, second mounting means mounting said second fluid cylinder and piston means between said deck and said lip, conduit means for effecting communication between said first cylinder means and said second cylinder means to permit fluid to be pumped from said first cylinder means to said second cylinder means as said deck is raised and to permit fluid to flow from said second cylinder means to said first cylinder means as said deck is lowered, coupling means coupling said second piston means to said link means to cause said second cylinder means and said second piston means to move said lip from said stored lowermost position toward a raised position and to raise said lip means in response to the pumping of fluid from said first cylinder means to said second cylinder means through said conduit means when said deck is raised and to lower said lip means in response to the pumping of fluid from said second cylinder means to said first cylinder means through said conduit means as said deck is lowered, and deactivating means for selectively effectively uncoupling said first fluid cylinder and piston means from between said deck and said base frame to permit said deck to be raised without raising said lip and to permit a raised lip to be lowered without lowering a raised deck.

28. An actuating construction as set forth in claim 27 wherein said deactivating means comprises a toggle clamp effectively located between said first fluid cylinder and piston means and said deck.

29. In a dock leveler having a base frame, a deck with inner and outer sides, first hinge means pivotally mounting said inner side of said deck on said base frame, a lip, second hinge means pivotally mounting said lip at said outer side of said deck, link means operatively connected between said deck and said lip for normally retaining said lip in a stored lowermost position and for applying a force for pivoting said lip about said second hinge means toward a raised position after said lip is moved away from said stored lowermost position, and deck raising and lowering means coupled between said base frame and said deck for effecting raising and lowering movement of said deck about said first hinge means, the improvement comprising first fluid cylinder and piston means including first cylinder means and first piston means, first mounting means mounting said first fluid cylinder and piston means between said base frame and said deck, second fluid cylinder and piston means including second cylinder means and second piston means, second mounting means mounting said second fluid cylinder and piston means between said deck and said lip, conduit means for effecting communication between said first cylinder means and said second cylinder means to permit fluid to be pumped from said first cylinder means to said second cylinder means as said deck is raised and to permit fluid to flow from said second cylinder means to said first cylinder means as said deck is lowered, coupling means coupling said second piston means to said link means to cause said second cylinder means and said second piston means to move said lip from said stored lowermost position toward a raised position and to raise said lip means in response to the pumping of fluid from said first cylinder means to said second cylinder means through said conduit means when said deck is raised and to lower said lip means in response to the pumping of fluid from said second cylinder means to said first cylinder means through said conduit means as said deck is lowered, said second mounting means including means for permitting said lip to be raised manually without affecting flow of fluid between said first and second fluid cylinder means, and stop means associated with said second mounting means for limiting manual lowering of said lip.

* * * * *

UNITED STATES PATENT AND TRADEMARK OFFICE
CERTIFICATE OF CORRECTION

PATENT NO. : 4,823,421

DATED : April 25, 1989

INVENTOR(S) : Joseph P. H. Kleynjans et al

It is certified that error appears in the above-identified patent and that said Letters Patent is hereby corrected as shown below:

Column 1, line 37, change "hydrulic" to --hydraulic--.
Column 3, line 36, change "3'" to --13'--;
          line 38, change "6" to --16--;
          line 44, change "7" to --47--.
Column 6, line 25, change "desrribed" to --described--.
Column 9, line 39 (claim 10), cancel "sliding rectilinear".
Column 9, line 57 (claim 12), cancel "sliding rectilinear".
Column 10, line 27 (claim 16), after "means" insert --for--;
           line 28 (claim 16), cancel "for".
Column 11, line 21 (claim 20), cancel "]";
           line 37 (claim 20), change "si" to --is--;
           line 38 (claim 20), change "pistion" to --piston--.
Column 12, line 17 (claim 21), cancel "lip from said" (second occurrence);
           line 20 (claim 21), cancel "deck";
           lines 24 and 25 (claim 21), change "first cylinder" to
                       --deck is lowered, said--.
Column 13, line 52 (claim 27), cancel "a" (second occurrence).
Column 14, line 41 (claim 29), change "pistion" to --piston--.

Signed and Sealed this

Third Day of October, 1989

Attest:

DONALD J. QUIGG

*Attesting Officer*  *Commissioner of Patents and Trademarks*